United States Patent Office 3,211,689
Patented Oct. 12, 1965

3,211,689
PLASTIC FLOOR COVERINGS CONTAINING VINYL CHLORIDE RESINS PLASTICIZED WITH BENZYL PHTHALATES
Joseph R. Darby, Webster Groves, Mo., assignor to Monsanto Company, a corporation of Delaware
No Drawing. Filed Jan. 17, 1963, Ser. No. 252,025
8 Claims. (Cl. 260—31.4)

This invention relates generally to a composition containing a polymerized vinyl chloride resin, and more particularly to a composition comprising a polymerized vinyl chloride resin and a mixture of certain plasticizers therefor.

Hard surface floor coverings are more widely used today than ever before. In particular, plastic floor coverings containing a thermoplastic resin as a binder instead of linoleum cement are finding more and more applications throughout the country. Wider use of plastic floor covering has made it possible to produce the floor covering in a great variety of colors and patterns, many of which are of pastel shade or of other light color; even white floorings, or floorings containing a great deal of white, are in use.

Use of these light-colored plastic floorings has produced an unexpected problem throughout the industry. Those parts of light-colored plastic floorings subjected to heavy traffic have developed undue brownish or yellowish stains. This phenomenon, known as traffic staining, now constitutes one of the major problems in the use of light-colored plastic floorings in heavy traffic areas. The industry has devoted much research time and effort in an attempt to solve it, but no good solution has been found as yet. It has been learned that the traffic staining problem appears to be related to the plasticizer used with the polymerized vinyl chloride resin binder in the floorings, but, to date, all efforts to find a suitable plasticizer which will eliminate or minimize traffic staining have been unavailing.

It is the primary object of the present invention to supply a plasticized polymerized vinyl chloride resin composition suitable for use in a plastic flooring binder which will reduce or eliminate the traffic staining phenomenon. A further object is to present a plastic floor covering binder having increased strength when used in a floor covering, while at the same time minimizing traffic staining.

These objects are achieved in a straightforward and unexpected manner. The invention contemplates a plastic floor covering binder comprising a polymerized vinyl chloride resin selected from the group consisting of polyvinyl chloride, vinyl chloride-vinyl acetate copolymers, and mixtures thereof. As a plasticizer for the polymerized vinyl chloride resin, the invention contemplates about 5 to 100 parts by weight of a mixture of butyl benzyl phthalate and methoxyethoxyethyl benzyl phthalate per 100 parts by weight of the polymerized vinyl chloride resin. Within this wider range, it is preferred to employ from about 20 to 50 parts of plasticizer per 100 parts of resin.

The polymerized vinyl chloride resins to be used in the compositions of the present invention may be those low to medium molecular weight resins available in commerce. Exemplary of such resins are the vinyl chloride-vinyl acetate copolymers containing about 3% to 5% vinyl acetate made by the Bakelite Company and bearing the designations "VYMF" and "VYVF." The copolymers containing about 13% vinyl acetate, such as those designated "VYNW" and "VYHH," are suitable. Straight polyvinyl chloride resins, such as those designated Geon and Opalon resins, particularly "Geon 121," "Geon 126" and "Opalon 630," are suitable. Mixtures of the straight polymer and the copolymers will frequently be used. The most significant property of the polymerized vinyl chloride resins suitable for use in the compositions of the present invention is that of yielding a hard, tough and otherwise suitable surface covering material after being plasticized and admixed with suitable fillers and/or other ingredients and formed into a surface covering material.

Generally speaking, the present composition to be used as a binder comprises about 50% to about 25% by weight of the wearing surface composition of the floor covering. The binder is admixed with filler, including pigment, in such proportions that the filler comprises about 50% to about 75% by weight of the composition. When the filler content is below about 50%, pattern control may be difficult. When more than about 75% by weight of filler is present, the physical properties of the finished surface covering materials do not measure up to the desired standards in the floor covering art. The filler material may be organic or inorganic, or mixtures thereof. The filler often includes a preponderant proportion by volume of fibrous filler, such as wood flour, cork particles, asbestos, other mineral fibers, and the like. The remainder of the filler component is comprised of finely divided particles such as whiting, clay, silica, slate flour, and similar non-fibrous filler material. If the flooring is destined to be installed below grade, then it is preferred that the filler system consist of inorganic fillers, fibrous or non-fibrous or both. Such a filler system is insensitive to the alkaline moisture conditions encountered on below-grade or on-grade installations. Also included in the filler component are small but effective amounts of lubricants and detackifying agents, such as, for example, stearic acid, paraffin wax, ceresin wax, oleic acid and lauric acid. Synthetic rubber, such as the butadiene-styrene copolymers or the butadiene-acrylonitrile copolymers, may be added. The addition of these rubbers renders the composition sulfur-curable, whereupon vulcanizing agents and curing accelerators may then be added to the filled composition. Thus there may be added sulfur, or sulfur-containing compounds, along with various vulcanization accelerators as, for example, zinc phenyl ethyl dithiocarbamate, diethyl dithiocarbamate, zinc isopropyl dithiocarbamate, zinc diethyl dithiocarbamate, zinc phenyl ethyl dithiocarbamate, diphenyl guanadine, tetraethyl thiuram disulfide, and tetramethyl thiuram disulfide. Stabilizers or antioxidants, such as hydroquinone, N-phenyl α-naphthylamine, N-phenyl β-naphthylamine, N,N′-exomethylene-bis-ortho-hydroxy benzamide, sodium acid phosphate, dibutyl tin dilaurate, and others known in the art, may be used. The total amount of the compounding agents, exclusive of the fibrous and non-fibrous filler, generally runs up to about 10% by weight of the filler. The plasticizers usually incorporated into the composition are dioctyl phthalates, dicapryl phthalate, dibutyl sebacate, dibutoxy ethyl phthalate, tricresyl phosphate, dibutyl phthalate, N-alkyl toluene sulfonamide, and other known plasticizers. Epoxidized plasticizers may be used, such as the epoxidized soybean oil fatty acids. Various polymeric plasticizers have also been used.

The plasticizer mixture of this invention is employed in amounts of from 1 to 10 parts of methoxyethoxyethyl benzyl phthalate per part of butyl benzyl phthalate. Within this broader range, it is particularly preferred to employ about 1 to 6 parts of the former per part of the latter.

In general, the individual phthalate plasticizers of this invention are prepared by reacting phthalic anhydride with a slight molar excess of the desired alcohol, triethylamine and benzyl chloride. The first two reactants are heated, and the triethylamine is added slowly. When part of the amine is in, the temperature is raised, and the benzyl chloride and the rest of the amine are added. Hydrogen chloride is added to form the amine hydrochloride, and the phthalate product is worked up with a series of water and caustic washes. It should be apparent, however, that other and different methods of preparation, known to those skilled in the art, can also be used.

In order to demonstrate some of the desirable and unexpected properties displayed by the plasticizer mixtures of this invention, a number of resinous compositions were prepared and subjected to various test procedures. Such compositions included not only those containing said mixtures, but also others containing only one of the components of the plasticizer mixtures.

In a first series of tests, a polyvinyl chloride resin was stirred together with each of the following plasticizers:

(A) Butyl benzyl phthalate,
(B) Methoxyethoxyethyl benzyl phthalate,
(C) Three parts of methoxyethoxyethyl benzyl phthalate per part of butyl benzyl phthalate,
(D) Six parts of methoxyethoxyethyl benzyl phthalate per part of butyl benzyl phthalate.

Milled samples of the plasticized compositions were prepared. With a 50% concentration of plasticizer, it was found that the sample containing B had a moderate odor, while the samples containing C and D displayed only a slight odor. When molded sheets were prepared with the same plasticizer concentration, the sample with B was found to be cloudy, while the samples with C and D were both clear. In order to test heat stability, samples containing a 30% concentration of plasticizer were placed in an oven for 15- and 30-minute periods at 150° C. After 15 minutes, the stability of the samples with C and D was good, but the stability of the sample with B was only poor to fair. At the end of the longer period, the B sample showed brown spots, while the C and D samples showed only some yellowing.

Samples containing a 40% concentration of plasticizer were then checked for volatility and kerosene extraction in accordance with A.S.T.M. procedures. In the volatility test, the sample containing A showed a 10.5% plasticizer loss, while the C and D samples showed losses of only 4.7% and 3.2%, respectively. In the kerosene extraction test, samples containing A and B showed plasticizer losses of 2.5% and 1.4%, respectively, in contrast to losses of 0.8% and 0.7%, respectively, for the C and D samples.

As a test of stain resistance, flooring compositions were prepared. Such compositions contained the following ingredients, all figures being in parts by weight:

| | Parts |
|---|---|
| Polyvinyl chloride | 100 |
| Plasticizer | 38 |
| Limestone | 170 |
| Titanium dioxide | 15 |
| Epoxidized soybean oil | 4.3 |
| Barium-cadmium stabilizer | 1.5 |
| Octyl diphenyl phosphite | 1.0 |
| Paraffin wax | 0.5 |
| Stearic acid | 0.5 |

After the usual mixing and sheet-forming operations, test installations were made wherein white floor coverings in the form of sheets having the above formula were installed in heavy traffic areas. After three months of use, the flooring was inspected for staining. The compositions containing plasticizers A and B were appreciably darker and carried a heavier yellow permanent traffic stain than did the compositions containing plasticizers C and D.

In order to assess quantitative values, similar tests were made with compositions containing a variety of known plasticizers. A scale of 1 to 10 was employed, and the value of 1 was given to the composition containing diisodecylphthalate which showed the least stain resistance. Higher numbers show greater stain resistance, a value of 10 being an indication of no staining. The flooring composition with plasticizer A had a value of 5, and the composition with plasticizer B had a value of 6. Those compositions which contained plasticizers C and D had values of 8 and 7, respectively.

Further tests were made on flooring compositions containing plasticizers A and B, and also on a composition containing 1 part of methoxyethoxyethyl benzyl phthalate per part of butyl benzyl phthalate (hereinafter designated as E). Flooring samples containing plasticizers A, B and E were treated with a number of diverse stainants, including mustard, catsup, lipstick, rubber extract, and used crankcase oil. In each instance, the sample containing plasticizer E had a higher luminosity showing the best stain resistance.

While this invention has been described with respect to certain specific embodiments, it is not so limited. It is to be understood that variations and modifications thereof, obvious to those skilled in the art, may be made without departing from the spirit and scope of the invention.

The embodiments of the invention in which an exclusive property or privilege is claimed are defined as follows:

1. A vinyl chloride resin composition comprising a polymerized vinyl chloride resin selected from the group consisting of polyvinyl chloride, vinyl chloride-vinyl acetate copolymer, and mixtures thereof, and from about 5 to 100 parts by weight, per 100 parts by weight of the polymerized vinyl chloride resin, of a mixture of methoxyethoxyethyl benzyl phthalate and butyl benzyl phthalate, from about 1 to 10 parts of the methoxyethoxyethyl benzyl phthalate being employed per part of the butyl benzyl phthalate.

2. A composition as defined in claim 1 wherein from about 1 to 6 parts of methoxyethoxyethyl benzyl phthalate is employed per part of butyl benzyl phthalate.

3. A composition as defined in claim 1 wherein from about 20 to 50 parts by weight of the mixture of methoxyethoxyethyl benzyl phthalate and butyl benzyl phthalate are employed per 100 parts by weight of the polymerized vinyl chloride resin.

4. A composition as defined in claim 1 wherein the polymerized vinyl chloride resin is polyvinyl chloride.

5. A vinyl chloride resin composition comprising polyvinyl chloride and from about 20 to 50 parts by weight, per 100 parts by weight of polyvinyl chloride, of a mixture of methoxyethoxyethyl benzyl phthalate and butyl benzyl phthalate, from about 1 to 6 parts of the methoxyethyl benzyl phthalate being employed per part of the butyl benzyl phthalate.

6. A composition as defined in claim 5 wherein about 3 parts of methoxyethoxyethyl benzyl phthalate is employed per part of butyl benzyl phthalate.

7. A composition as defined in claim 5 wherein about 6 parts of methoxyethoxyethyl benzyl phthalate is employed per part of butyl benzyl phthalate.

8. A composition as defined in claim 5 wherein about 1 part of methoxyethoxyethyl benzyl phthalate is employed per part of butyl benzyl phthalate.

References Cited by the Examiner

UNITED STATES PATENTS

| 2,020,356 | 11/35 | Hawley | 260—475 |
| 2,298,186 | 10/42 | Woodhouse et al. | 260—32.2 |
| 2,628,249 | 2/53 | Bruno | 260—475 |
| 2,773,851 | 12/56 | Tolman | 260—31.8 |
| 2,862,959 | 12/58 | Patrick et al. | 260—31.8 |

MORRIS LIEBMAN, *Primary Examiner.*